(12) United States Patent
McJunkin et al.

(10) Patent No.: US 12,241,429 B2
(45) Date of Patent: Mar. 4, 2025

(54) ENGINE IDLE SPEED LOGIC SYSTEMS AND METHODS

(71) Applicant: TOYOTA MOTOR ENGINEERING & MANUFACTURING NORTH AMERICA, INC., Plano, TX (US)

(72) Inventors: Adam C. McJunkin, Ann Arbor, MI (US); James J. Wallace, Ann Arbor, MI (US); Shigeki Amano, Ann Arbor, MI (US); Garrett Parker Munson, Milford, MI (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 77 days.

(21) Appl. No.: 18/069,834

(22) Filed: Dec. 21, 2022

(65) Prior Publication Data

US 2024/0209808 A1    Jun. 27, 2024

(51) Int. Cl.
*F02D 41/08* (2006.01)
*F02D 41/14* (2006.01)
*F02D 41/16* (2006.01)

(52) U.S. Cl.
CPC ......... *F02D 41/083* (2013.01); *F02D 41/086* (2013.01); *F02D 41/1401* (2013.01); *F02D 41/16* (2013.01); *F02D 2041/1433* (2013.01); *F02D 2200/021* (2013.01); *F02D 2200/503* (2013.01)

(58) Field of Classification Search
CPC ......... F02D 41/08–086; F02D 41/1401; F02D 2041/1433; F02D 2200/021; F02D 2200/503
See application file for complete search history.

(56) References Cited

U.S. PATENT DOCUMENTS 7,552,006 B2    6/2009    Maeda

FOREIGN PATENT DOCUMENTS

| CN | 101519074 A | 9/2009 |
|---|---|---|
| CN | 109072797 B | 12/2018 |
| CN | 113404598 A * | 9/2021 |
| FR | 3026992 B1 | 4/2016 |
| JP | 2005042559 A | 2/2005 |
| JP | 3656870 B2 * | 6/2005 |
| WO | 2009094367 A1 | 7/2009 |

* cited by examiner

*Primary Examiner* — Hung Q Nguyen
*Assistant Examiner* — Mark L. Greene
(74) *Attorney, Agent, or Firm* — HAYNES AND BOONE, LLP

(57) ABSTRACT

Systems and methods for controlling engine idle speed based on electrical load are provided. A system includes a logic device configured to perform various operations for controlling an idle speed of an engine. The logic device is configured to determine a state of charge (SOC) of a battery, a maximum output of an alternator at a current idle speed of an engine, and a load on the alternator. The logic device is further configured to initiate an increased idle speed of the engine based on the determined SOC of the battery and based on the load being greater than the maximum output. The logic device is further configured to initiate a decreased idle speed of the engine based on the SOC being less than an SOC threshold. Associated methods are also provided.

17 Claims, 7 Drawing Sheets

ENGINE IDLE SPEED LOGIC SYSTEMS AND METHODS

TECHNICAL FIELD

The present disclosure relates generally to engine control, and, more particularly, to systems and methods for controlling engine idle speed based on electrical load.

BACKGROUND

When electrical loads of a vehicle (e.g., lighting systems, defroster, blower, engine fan, air condition ("A/C"), etc.) are maxed out, an alternator of the vehicle is not capable of sustaining enough electrical output at normal idle speeds to support the electrical loads. Current systems address this issue by idling the engine speed much higher when the vehicle's A/C system is turned on (e.g., when the A/C compressor is engaged). When the A/C is running, the A/C compressor cycles on and off often, which causes the idle engine speed to raise/lower according to the compressor being turned on and off. This results in unwanted noise and vibrations that the driver may feel when the vehicle is idling.

BRIEF SUMMARY

Various embodiments of the present disclosure include a method for controlling an idle speed of an engine. The method includes determining a state of charge (SOC) of a battery. The method further includes determining a maximum output of an alternator at a current idle speed of an engine. The method further includes determining a load on the alternator. The method further includes initiating an increased idle speed of the engine based on the determined SOC of the battery and based on the load being greater than the maximum output.

Various embodiments of the present disclosure include a system including a battery, an alternator, an engine, and an idle control system. The idle control system may include a logic device configured to determine an SOC of the battery, determine a maximum output of the alternator at a current idle speed of the engine, and determine a load on the alternator. The logic device is further configured to initiate an increased idle speed of the engine based on the determined SOC being below an SOC threshold and based on the load being greater than the maximum output.

Various embodiments of the present disclosure include an idle control system. The idle control system includes a logic device configured to perform various operations for controlling an idle speed of an engine. The logic device is configured to determine a state of charge (SOC) of a battery, a maximum output of an alternator at a current idle speed of an engine, and a load on the alternator. The logic device is further configured to initiate an increased idle speed of the engine based on the determined SOC of the battery and based on the alternator load being greater than the maximum possible output at the current engine speed.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
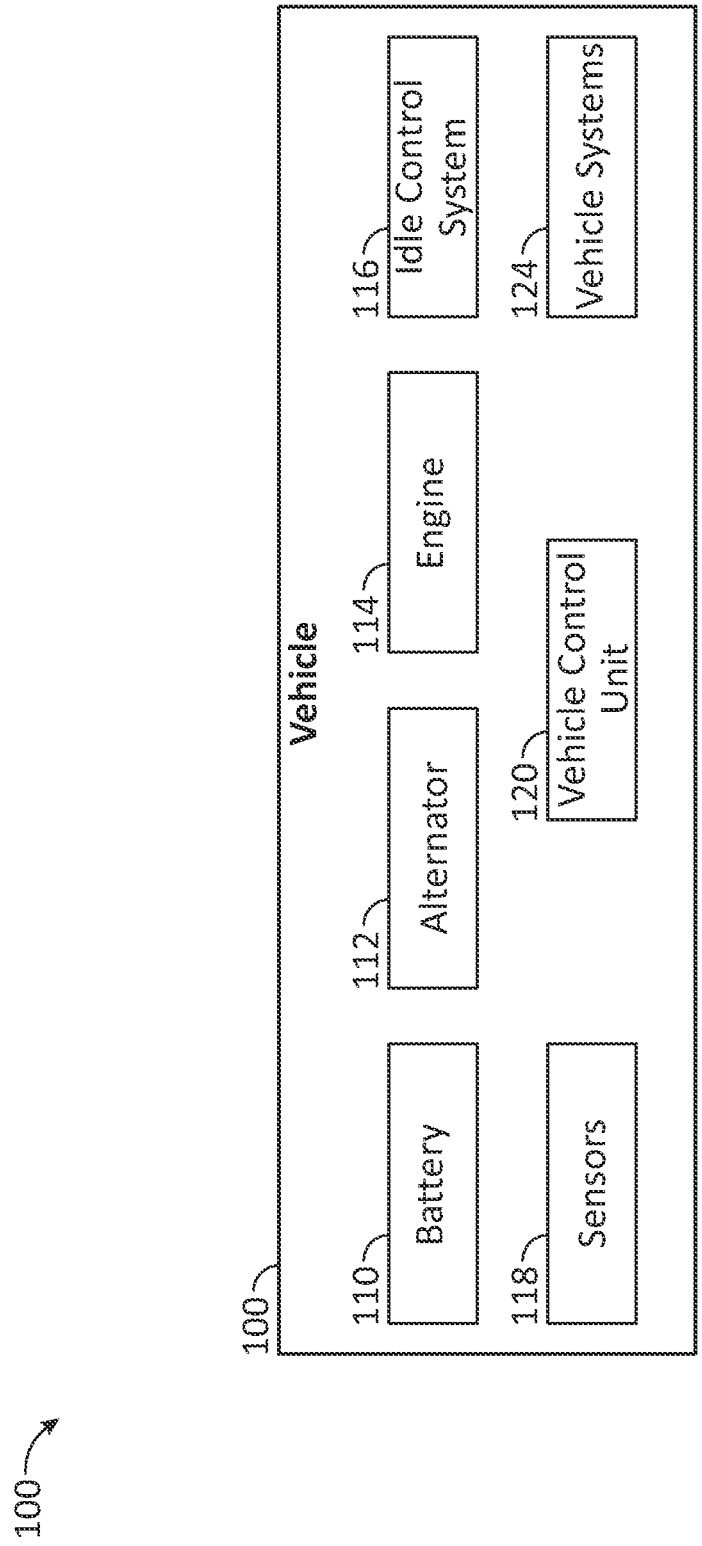
FIG. 1 is a diagram illustrating various systems of a vehicle, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to systems and methods that track the state of charge (SOC) of a vehicle battery along with an alternator output to request a high idle condition only when it is needed to support electrical requests and to protect the battery from low SOC/damage. Rather than changing the engine idle speed in relation to A/C compressor engagement, the logic of the present disclosure increases the engine idle speed based on alternator demand and battery SOC.

When it is detected that the alternator is at its maximum capacity (e.g., when all electrical loads of the vehicle are turned on) and a determined SOC of the battery is decreasing (based on the assumption that when the alternator is maxed out, current is being pulled from the battery to compensate) and the SOC is below a threshold, the logic of the present disclosure determines that the engine idle speed needs to increase, the engine idle speed may be increased accordingly.

When the SOC of the battery increases to be above a threshold SOC, the engine idle speed may be decreased to a base speed. Before decreasing the engine idle speed, the logic of the present disclosure may determine whether the alternator will be at maximum capacity again. Such a determination may be based on simple checks, such as the engine coolant temperature (e.g., if the engine coolant temperature is high, it is likely that an electric engine cooling fan will turn on, causing a strain on the alternator). If it is likely that the alternator will continue to operate at maximum capacity, the engine idle speed will not be decreased.

FIG. 1 is a diagram illustrating various systems of a vehicle 100, according to one or more embodiments of the disclosure. Referring to FIG. 1, vehicle 100 may include a battery 110, an alternator 112, an engine 114, an idle control system 116, one or more sensors 118, a vehicle control unit 120, and other vehicle systems 124. Vehicle 100 may be any type of vehicle, including, for example, a truck, a sport utility vehicle, a crossover utility vehicle, a van, a multipurpose vehicle, a sedan, a hatchback, a wagon, a coupe, a sports car, a convertible, or any other type of vehicle.

Battery 110 may be any device used as a source of electrical power, such as any device that converts chemical energy into electrical energy. For example, battery 110 may include one or more electrochemical cells with external connections for powering an electrical system of vehicle 100. Battery 110 may be rechargeable, such as by alternator 112, and may include many types or configurations, including lithium ion, lead-acid, or wet cell, among others.

Alternator 112 may be any mechanical device operable to convert mechanical energy into electrical energy, such as AC or DC electrical energy. In this regard, alternator 112 may be a true alternator as understood conventionally to induce alternating current, or alternator 112 may be a generator as understood conventionally to induce either alternating current or direct current. However, for sake of convenience and without intent to limit, element 112 will be referred to simply as "alternator."

Engine 114, or motor, may be any machine operable to convert one or more forms of energy into mechanical energy. For example, engine 114 may be an internal combustion engine, although other configurations are contemplated. As described herein, engine 114 may operate at a minimum engine speed (i.e., idle speed), such as when vehicle 100 is stationary. When idling, engine 114 may operate without any loads other than engine accessories. The idle speed, which may be referred to simply as "idle," is the rotational speed of engine 114 when engine 114 is uncoupled from the drivetrain and the throttle pedal is not depressed. Idle speed may be measured in revolutions per minute (rpm) of the engine's crankshaft. At idle speed, engine 114 generates enough power to run reasonably smoothly and operate its ancillaries (water pump, alternator 112, air conditioning, power steering etc.), but usually not enough to perform useful work, such as moving vehicle 100.

Idle control system 116 may be configured to control the idle speed of engine 114. For instance, if engine 114 is operating many accessories, the idle speed may need to be raised to ensure that alternator 112 generates enough power to operate the accessories. In such embodiments, idle control system 116 may increase or decrease the idle speed of engine 114 based on sensed conditions, such as based on a state of the vehicle's electrical system. For example, idle control system 116 may track the state of charge (SOC) of battery 110 along with an output of alternator 112 to request a high idle condition when needed to support electrical demand and protect battery 110 from low SOC and/or damage, as detailed below.

Idle control system 116 may utilize various algorithms and decision structures to control engine idle speed. For example, based on a detection that the alternator 112 is above a threshold capacity, such as at a maximum capacity (e.g., when all electrical loads of vehicle 100 are turned on or anticipated to be turned on), and based on a determined SOC of the battery 110 is below a threshold and decreasing (e.g., based on an assumption that current is being pulled from the battery 110 to compensate for the alternator 112 being maxed out), idle control system 116 may determine that the idle speed of engine 114 needs to increase.

In addition, when the SOC of battery 110 increases to be above the threshold SOC, the idle speed of engine 114 may be decreased to a base level by idle control system 116. In embodiments, before reducing the idle speed, idle control system 116 may determine whether alternator 112 will be at maximum capacity, such as based on detected engine water temperature. For example, if engine water temperature is high, it may be likely that the engine fan will remain on or start soon, which causes a strain on alternator 112. If it is likely that alternator 112 will continue to operate at maximum capacity, the idle speed may not be decreased.

Sensors 118 may include any number and type of sensor supporting operation of vehicle 100 or any other operations described herein (e.g., engine idle control). For example, sensors 118 may include an accelerometer, an inertial measurement unit (IMU), a temperature sensor, an engine speed sensor, a current sensor, a voltage sensor, a battery sensor, among other sensors, or any combination thereof.

Vehicle control unit 120 may be any logic device, controller, processor, module, circuitry, or device configured to perform one or more operations. Vehicle control unit 120, which may be referred to as a logic device, may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of vehicle 100, such as idle control system 116, vehicle systems 124, and/or other elements of vehicle 100, for example. Such software instructions may also implement methods for processing sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 100).

Vehicle control unit 120 may be communicatively connected to idle control system 116 and vehicle systems 124. Vehicle control unit 120 may be configured to receive data from at least one sensor 118 of vehicle 100. Depending on the application, vehicle control unit 120 may receive and transmit data over wired or wireless communication.

With continued reference to FIG. 1, vehicle 100 may include other components or systems. For example, vehicle systems 124 may include a propulsion system (e.g., engine 114 coupled to a drivetrain), a suspension system, a GPS system, a vehicle dynamics system, interfaces, controllers, control systems, an audio system, a display system, a communications system, and/or a user interface system, among others, of vehicle 100.

Figure 2:
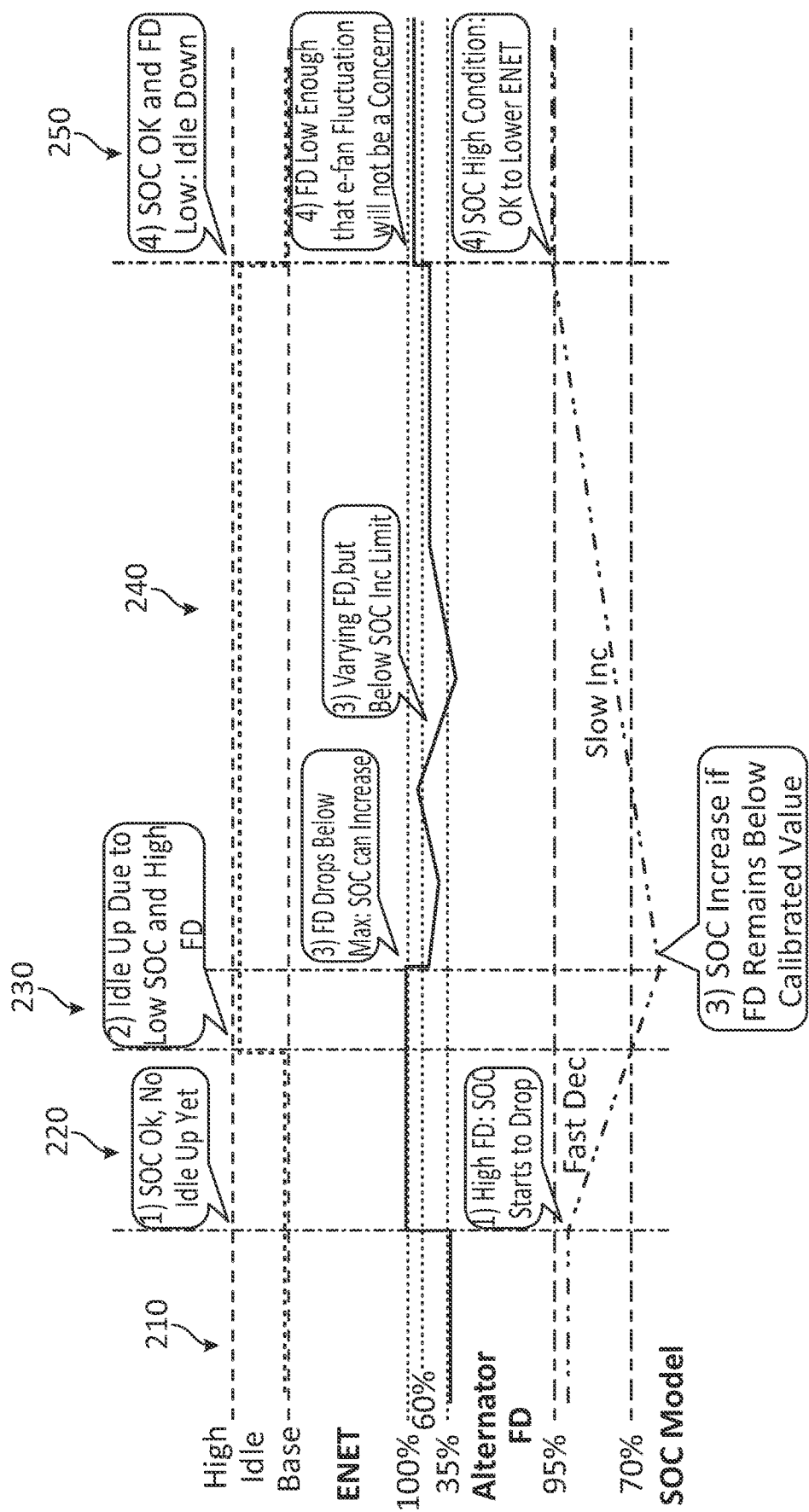
FIG. 2 is a diagram illustrating engine idle behavior, according to one or more embodiments of the disclosure.

FIG. 2 is a diagram illustrating engine idle behavior (e.g., as controlled by idle control system 116), according to one or more embodiments of the disclosure. Referring to FIG. 2, idle control system 116 may adjust an engine speed target ("ENET") of engine 114, such as switching between a base idle target and a high idle target based on sensed conditions. Base idle target may be a minimum idle speed of engine 114 (e.g., at or around 600 rpm). High idle target may be a high idle speed of engine 114, such as an increased idle speed above base idle target (e.g., at or around 850 rpm).

In embodiments, idle control system 116 may monitor a field duty of alternator 112 ("Alternator FD") and model the SOC of battery 110 ("SOC Model") to determine when to switch between base idle target and high idle target. The alternator field duty may be a percentage of maximum output of alternator 112. Depending on the application, the SOC of battery 110 may be determined by a sensor or via modeling SOC based on experienced loads. As shown in area 210 of FIG. 2, the Alternator FD is relatively low and the SOC Model indicates that the SOC of battery 110 is high. In such configurations, the engine speed target of engine 114 may be set at the base idle target.

In area 220, the Alternator FD has increased over area 210, such as at maximum capacity. With the increased alternator field duty, the SOC of battery 110 may decrease, as indicated by the SOC Model. In such configurations, the SOC of battery 110 may be determined as sufficient, and the engine speed target of engine 114 may remain at the base idle target.

In area 230, the Alternator FD has remained similar to area 220, such as at maximum capacity. However, unlike area 220, the SOC of battery 110 has decreased below an SOC threshold (e.g., 70% SOC, although other configurations are contemplated). In such configurations, the engine speed target of engine 114 may be increased to the high idle target to protect battery 110 from low SOC and/or damage.

In area 240, the Alternator FD has dropped below maximum capacity, and thus the SOC of battery 110 may increase (e.g., per the SOC Model). For example, the modeled SOC of battery 110 may increase if the field duty of alternator 112 remains below a calibrated value (e.g., 60% field duty, although other configurations are contemplated). As shown in area 240, the Alternator FD may vary, but the SOC of battery 110 may increase so long as the Alternator FD is below the calibrated value. In such configurations, the engine speed target of engine 114 may remain at the high idle target until the Modeled SOC increases to a required amount (e.g., at or above the SOC threshold based on alternator demand).

In area 250, the Alternator FD is still below maximum capacity, but the SOC of battery 110 has increased to a sufficient/threshold amount. In addition, the Alternator FD is low enough such that additional accessory load (e.g., electric fan fluctuation) may not be a concern. In such configurations, the engine speed target of engine 114 may be decreased to the base idle target.

Figure 3:
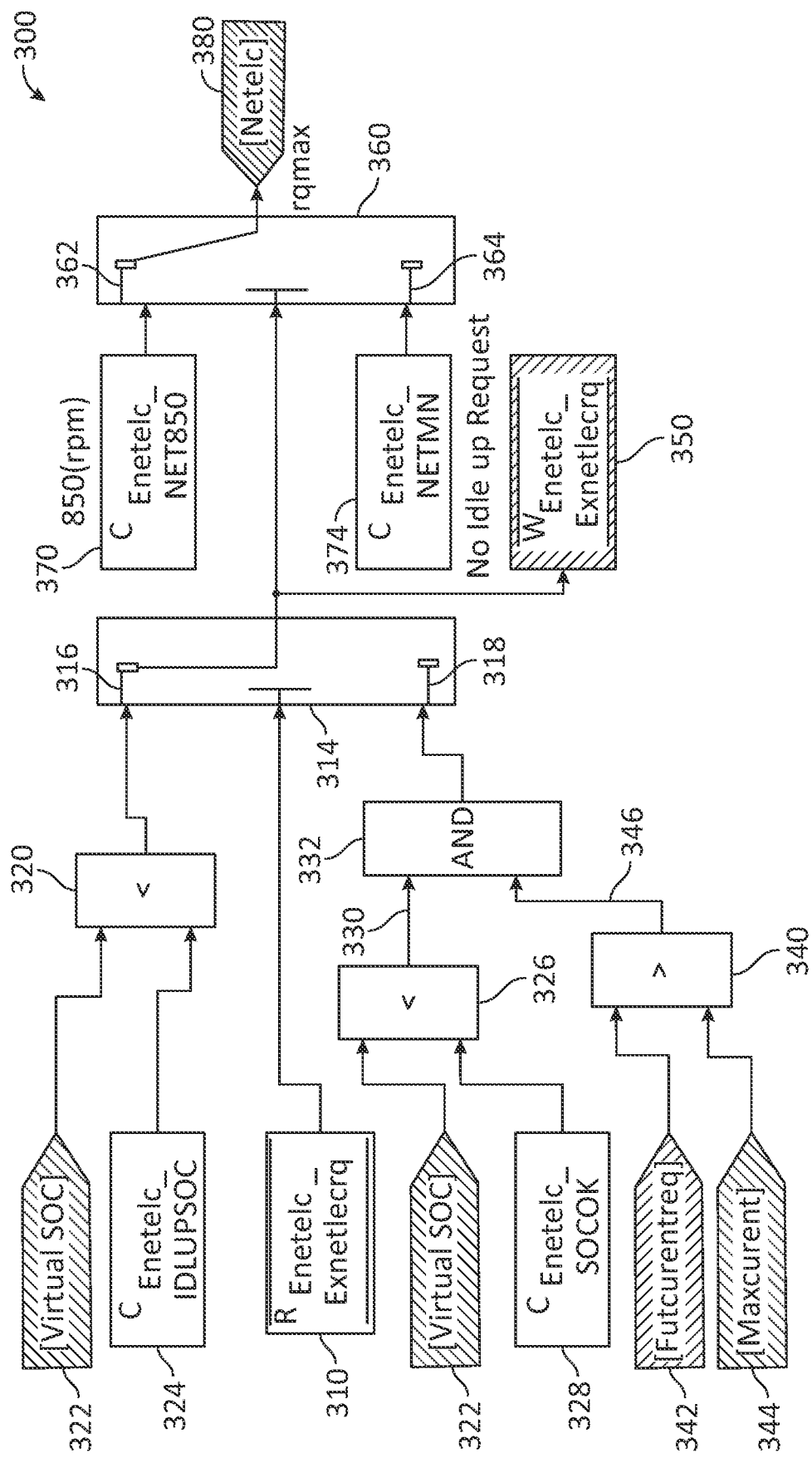
FIG. 3 is a diagram illustrating an idle speed logic, according to one or more embodiments of the disclosure.

FIG. 3 is a diagram illustrating an idle speed logic 300, according to one or more embodiments of the disclosure. Idle speed logic 300 may be used (e.g., by idle control system 116) to determine a calculated engine speed target ("netelc"). For example, idle speed logic 300 may be used to determine when to switch between a low idle condition and a high idle condition based on sensed or determined conditions.

In block 310, a current idle state condition ("enetelc_exnetlecrq") is provided to switch block 314. For example, during a high idle state condition, a first input value (e.g., a 1) may be provided to switch block 314. Similarly, during a low idle state condition, a second input value (e.g., a 0) may be provided to switch block 314. Based on the input value provided by block 310, switch block 314 may switch between a first input 316 and a second input 318. For example, the first input value may cause switch block 314 to switch to first input 316, and the second input value may cause switch block 314 to switch to second input 318.

In block 320, a Boolean operation is performed to determine if a modeled SOC based on charge/discharge of battery 110 ("[virtualsoc]" 322) is less than a calibrated value associated with an SOC value at which a high idle state will no longer be requested ("enetelc_IDLUPSOC"324). If [virtualsoc] 322 is less than enetelc_IDLUPSOC 324, block 320 will pass a first response (e.g., a 1) to first input 316 of switch block 314. If [virtualsoc] 322 is greater than enetelc_IDLUPSOC 324, block 320 will pass a second response (e.g., a 0) to first input 316 of switch block 314.

In block 326, a Boolean operation is performed to determine if the modeled SOC ([virtualsoc] 322) is less than a calibrated value associated with an SOC value at which SOC of battery 110 is too low ("enetelc_SOCOK" 328). If [virtualsoc] 322 is less than enetelc_SOCOK 328, block 326 will pass a first response (e.g., a "True") to a first input 330 of block 332. If [virtualsoc] 322 is greater than enetelc_SOCOK 328, block 326 will pass a second response (e.g., a "False") to first input 330 of block 332.

In block 340, a Boolean operation is performed to determine if an expected alternator demand ("[futcurentreq]" 342) is greater than a maximum output of alternator 112 ("[maxcurent]" 344). If [futcurentreq] 342 is greater than [maxcurent] 344, block 340 will pass a first response (e.g., a "True") to a second input 346 of block 332. If [virtualsoc] 322 is greater than [maxcurent] 344, block 326 will pass a second response (e.g., a "False") to second input 346 of block 332.

In block 332, the responses provided to first input 330 and second input 346 are analyzed. If the conditions of block 326 and block 340 are both met (e.g., first and second inputs 330, 346 both receiving a "True"), block 332 may provide a first response (e.g., a 0) to second input 318 of switch block 314. If any of the conditions of block 326 and block 340 are not met (e.g., any of first and second inputs 330, 346 receiving a "False"), block 332 may provide a second response (e.g., a 1) to second input 318 of switch block 314.

In block 350, the output of switch block 314 may be stored (e.g., in a look-up table or database). In such embodiments, the current value stored in block 350 may be provided back to switch block 314 via block 310.

As shown, the output of switch block 314 may be provided to switch block 360. For example, a first output value of switch block 314 (e.g., a 1) or a second output value of switch block 314 (e.g., a 0) may be provided to switch block 360. Based on the output value of switch block 314, switch block 360 may switch between a first input 362 and a second input 364. For example, the first output value of switch block 314 (e.g., a value of 1) may cause switch block 360 to switch to first input 362, and the second output value of switch block 314 (e.g., a value of 0) may cause switch block 360 to switch to second input 364.

Block 370 may provide a high idle target ("enetelc_NET850") to first input 362 of switch block 360. Block 374 may provide a low idle target ("enetelc_NETMN") to second input 364 of switch block 360. Based on the output value provided by switch block 314, switch block 360 may provide either enetelc_NET850 from block 370 or enetelc_NETMN from block 374 to block 380 for setting the engine speed target ("[netelc]" 380).

When enetelc_exnetlecrq indicates a high idle state condition (e.g., enetelc_exnetlecrq=1), switch block 314 will output the response provided by block 320 to block 350 and switch block 360. For example, block 320 may output a 1 while [virtualsoc] 322 is less than enetelc_IDLUPSOC 324, indicating that the SOC of battery 110 is below a desired threshold, thereby causing switch block 360 to output a high idle demand (e.g., from block 370). This output will be passed to block 350 and reinputted to switch block 314 via block 310 until the condition check of block 320 is not met.

When enetelc_exnetlecrq indicates a low idle state condition (e.g., enetelc_exnetlecrq=0), switch block 314 will output the response provided by block 332 to block 350 and switch block 360. For example, block 332 may output a 0 if any of the conditions of block 326 and block 340 are not met, thereby causing switch block 360 to output a low idle demand (e.g., from block 372). This output will be passed to block 350 and reinputted to switch block 314 via block 310 until the condition checks of blocks 326 and 340 are met. When the SOC of battery 110 is sufficiently low and the expected alternator load is high (e.g., future current demand is greater than maximum current), block 332 may output a 1 to initiate a high idle demand.

Figure 4:
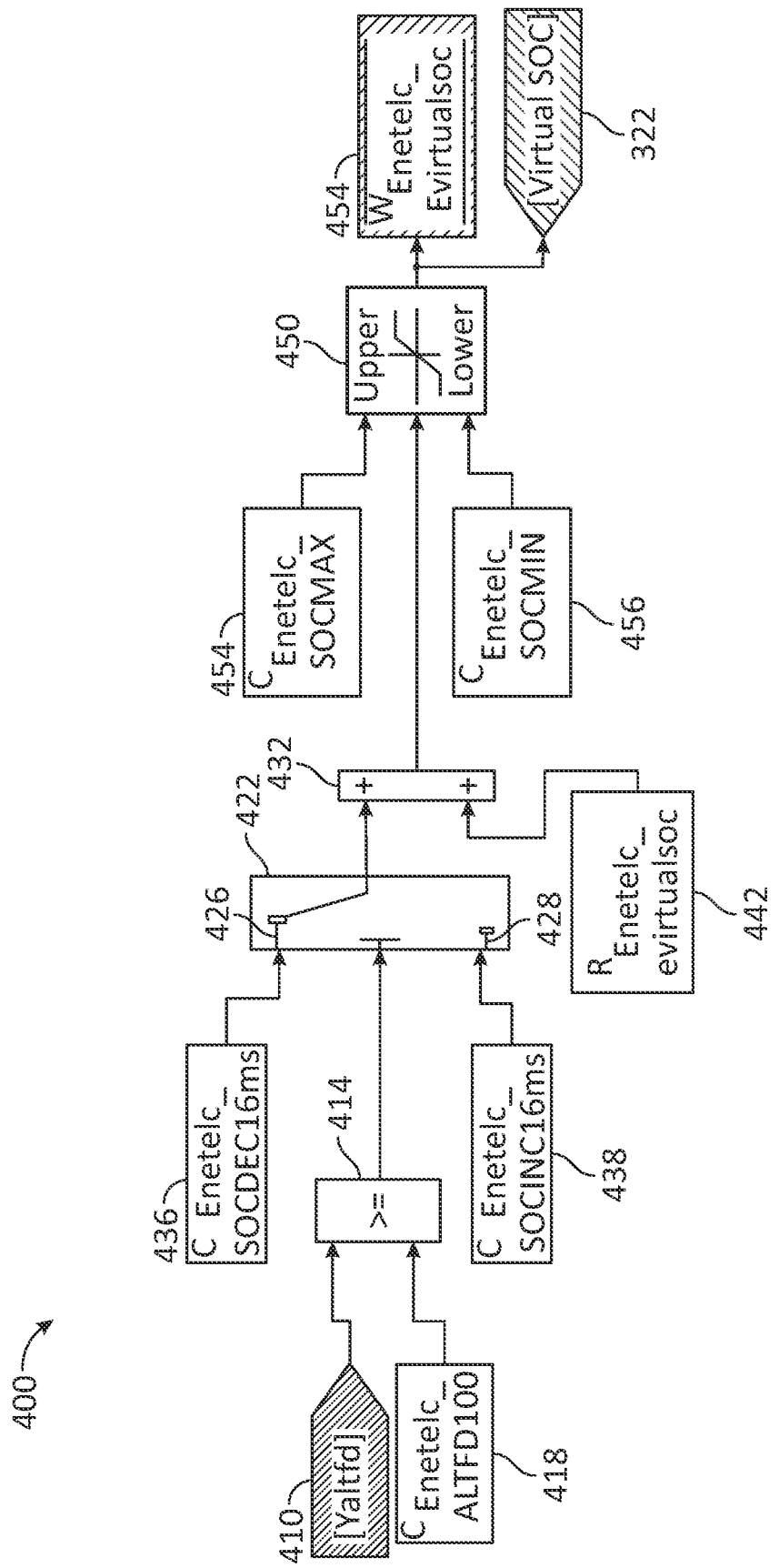
FIG. 4 is a diagram illustrating a state of charge logic, according to one or more embodiments of the disclosure.

FIG. 4 is a diagram illustrating an SOC logic 400, according to one or more embodiments of the disclosure. SOC logic 400 may be used (e.g., by idle control system 116) to determine or model SOC of battery 110. For example, SOC logic 400 may determine [virtualsoc] 322 for use in idle speed logic 300 of FIG. 3, among other logic structures or operations.

As shown, a current field duty of alternator 112 ("[yaltfd]" 410) is provided to block 414. In embodiments, a calibratable value associated with the alternator field duty at which battery 110 is at risk of discharge ("enetelc_ALTFD100" 418) is also provided to block 414.

In block 414, a Boolean operation is performed to determine if [yaltfd] 410 is greater than or equal to enetelc_ALTFD100. If [yaltfd] 410 is greater than or equal to enetelc_ALTFD100 418, block 414 will pass a first input value (e.g., a 1) to switch block 422. If [yaltfd] 410 is less than enetelc_ALTFD100 418, block 414 will pass a second input value (e.g., a 0) to switch block 422.

Based on the input value provided by block 414, switch block 422 may switch between a first input 426 and a second input 428. For example, the first input value provided by block 414 may cause switch block 422 to switch to first input 426, and the second input value provided by block 414 may cause switch block 422 to switch to second input 428.

During operation, switch block 422 may output a response or value to operations block 432. For example, a modeled SOC calibratable decrease rate ("enetelc_SOCDEC16*ms*" 436) may be provided to first input 426 of switch block 422. A modeled SOC calibratable increase rate ("enetelc_SOCINC16*ms*" 438) may be provided to second input 428 of switch block 422. In embodiments, enetelc_SOCDEC16*ms* 436 may decrease the modeled SOC of battery 110, such as at different rates depending on a determined worst-case discharge. Conversely, enetelc_SOCINC16*ms* 438 may increase the modeled SOC of battery 110, such as at different rates depending on a determined worst-case charge. Based on the input value provided by block 414, switch block 422 may provide either enetelc_SOCDEC16*ms* 436 or enetelc_SOCINC16*ms* 438 to operations block 432.

In block 442, the current modeled SOC of battery 110 ("enetelc_evirtualsoc") is provided to operations block 432. In embodiments, enetelc_evirtualsoc may be a simple modeled SOC of battery 110 based on a determined or modeled charge or discharge of battery 110, as described below, although other configurations are contemplated.

In operations block 432, one or more operations are performed using the values provided by switch block 422 and block 442. For example, the value provided by switch block 422 may be added to the value provided by block 442, and the combination provided for further processing. For example, an output of operations block 432 may be provided to block 450.

In block 450, the output of operations block 432 may be compared against upper and lower threshold values. For example, in block 454, a calibrated maximum value for the modeled SOC of battery 110 ("enetelc_SOCMAX") may be provided to block 450. In block 456, a calibrated minimum value for the modeled SOC of battery 110 ("enetelc_SOCMIN") may be provided to block 450. In such embodiments, the output of operations block 432 may be compared against the values provided by block 454 and block 456. The output of operations block 432 may be compared against the value provided by block 454 (enetelc_SOCMAX) to clip or set the modeled SOC of battery 110 on the high side if desired, such as to limit the modeled SOC to a calibrated maximum value. Conversely, the output of operations block 432 may be compared against the value provided by block 456 (enetelc_SOCMIN) to clip or set the modeled SOC of battery 110 on the low side if desired, such as to limit the modeled SOC to a calibrated minimum value.

In block 454, the output of block 450 may be stored (e.g., in a look-up table or database). In such embodiments, the current value stored in block 454 may be provided back to operations block 432 via block 442. The output of block 450 may also indicate the current SOC of battery 110 ([virtualsoc] 322), such as for use in idle speed logic 300 of FIG. 3, among other logic structures or operations.

Figure 5:
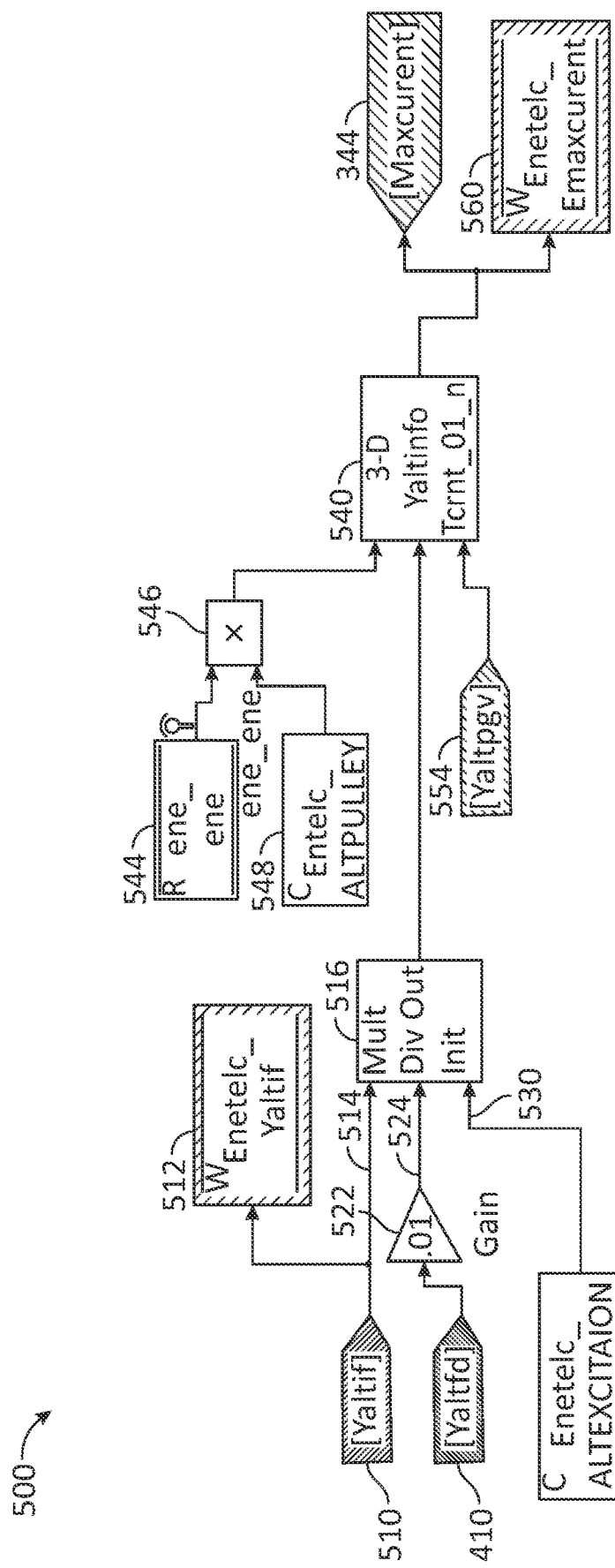
FIG. 5 is a diagram illustrating an alternator output logic, according to one or more embodiments of the disclosure.

FIG. 5 is a diagram illustrating an alternator output logic 500, according to one or more embodiments of the disclosure. Alternator output logic 500 may be used (e.g., by idle control system 116) to determine or model output of alternator 112. For example, alternator output logic 500 may determine [maxcurent] 344 for use in idle speed logic 300 of FIG. 3, among other logic structures or operations.

As shown, an alternator excitation current ("[yaltif]" 510) may be provided to block 512 and a first input 514 of block 516. In embodiments, [yaltif] 510 may be the amount of control current sent to alternator 112 to control the alternator's field duty. Depending on the application, [yaltif] 510 may vary, such as between 0 and 5 amps, although other configurations are contemplated. In block 512, [yaltif] 510 may be stored, such as in a look-up table or database.

In embodiments, [yaltfd] 410 is provided to operations block 522. In operations block 522, one or more operations are performed on [yaltfd] 410. For example, operations block 522 may apply a gain to [yaltfd] 410, such as a gain of 0.01, although other configurations are contemplated, with the output of operations block 522 provided to a second input 524 of block 516.

In block 526, a calibrated value of alternator excitation current ("enetelc_ALTEXCITATION") is provided to a third input 530 of block 516. In embodiments, enetelc_ALTEXCITATION may be the same as or different than [yaltif] 510, such as a read in copy of [yaltif] 510. For example, enetelc_ALTEXCITATION may be based on the current value of [yaltif] 510 stored in block 512, although other configurations are contemplated.

In block 516, one or more operations may be performed, and an output provided, such as to block 540. In block 516, first input 514 is read in and divided by the value of second input 524. This provides a maximum value of alternator excitation current based on the active value of the alternator field duty and excitation current. Third input 530 is a constant value (for typical purposes this will be set to normally achievable execution current such as 4 Amps) which will be used only for the first calculation cycle during initialization of the control system to prevent error states.

In block 544, the actual engine speed ("ene_ene") may be provided to operations block 546. In block 548, an alternator pulley ratio ("enetelc_ALTPULLEY") may be provided to operations block 546. The alternator pulley ratio value may be calibratable to adjust for different hardware configurations of different vehicles/engine and charging hardware packages. In embodiments, enetelc_ALTPULLEY may be a calibratable value to determine proper alternator speed based on engine speed. For example, operations block 546 may multiply ene_ene by enetelc_ALTPULLEY to provide an output to block 540.

In embodiments, a targeted alternator output voltage ("[yaltpgv]" 554) may be provided to block 540. In embodiments, [yaltpgv] 554 may a targeted output voltage of alternator 112 as determined by a charge control system (or other system) of vehicle 100.

In block 540, one or more operations may be performed, and an output provided. In embodiments, block 540 is used as a look-up function from a calibratable map with 3 inputs. A first input from block 546 may be the calculated alternator speed in RPM. A second input from block 516 may be the output of the maximum possible alternator excitation current. A third input 554 may be the value of the commanded alternator output voltage. These 3 inputs are used to approximate the maximum possible current output from the alternator at the given engine speed. The values in this map look-up block 540 may be determined by the physical hardware specifications of the alternator.

In embodiments, the output of block 540 may indicate an output of alternator 112, such as [maxcurent] 344 for use in idle speed logic 300 of FIG. 3, among other logic structures or operations. In block 560, the output of block 540 may be stored (e.g., in a look-up table or database). The current value stored in block 560 may be provided to various blocks or operations described herein.

Figure 6:
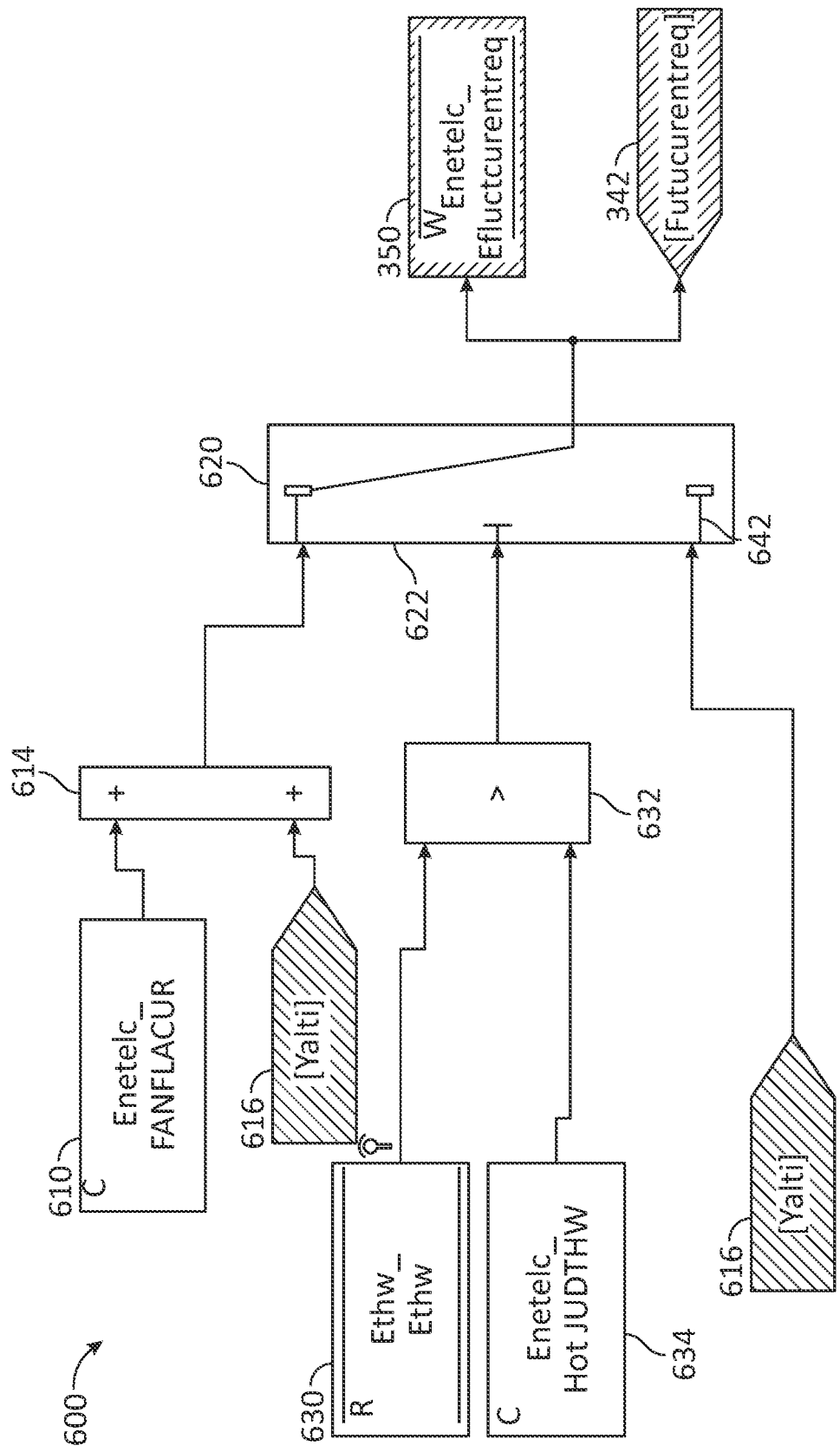
FIG. 6 is a diagram illustrating an alternator load logic, according to one or more embodiments of the disclosure.

FIG. 6 is a diagram illustrating an alternator load logic 600, according to one or more embodiments of the disclosure. Alternator load logic 600 may be used (e.g., by idle control system 116) to determine or model a demand on alternator 112. For example, alternator load logic 600 may determine [futcurentreq] 342 for use in idle speed logic 300 of FIG. 3, among other logic structures or operations.

In block 610, a calibratable value representing the amount of current an electric engine cooling fan will pull if it were to kick on ("enetelc_FANFLACUR") may be provided to operations block 614. In embodiments, enetelc_FANFLACUR may be used as a buffer based on hot engine coolant temperatures to limit idle speed hunting with a hot engine condition (i.e., idle speed increasing and dropping as the electric engine cooling fan cycles on and off). In embodiments, the current output of alternator 112 ("[yalti]" 616) may also be provided to operations block 614. In embodiments, [yalti] 510 may represent the amount of current generated by alternator 112.

In operations block 614, one or more operations are performed. For example, the value provided by block 610 may be added to [yalti] 616, and the combination provided for further processing. For example, an output of operations block 614 may be provided to a first input 620 of switch block 622.

In block 630, the engine coolant temperature ("ethw_ethw") is provided to block 632. In block 634, a calibratable value associated with engine coolant temperature ("enetelc_HOTJUDTHW") is provided to block 632. In embodiments, enetelc_HOTJUDTHW may represent an engine coolant temperature at which cycling of the electric engine cooling fan is anticipated or is otherwise of concern.

In block 632, a Boolean operation is performed to determine if ethw_ethw is greater than enetelc_HOTJUDTHW. If ethw_ethw is greater than enetelc_HOTJUDTHW, block 632 will provide a first input value (e.g., a 1) to switch block 622. If ethw_ethw is not greater than enetelc_HOTJUDTHW, block 632 will provide a second input value (e.g., a 0) to switch block 622.

In embodiments, current output of alternator 112 ([yalti] 616) is provided to a second input 642 of switch block 622. Based on the input value provided by block 632, switch block 622 may switch between first input 620 and second input 642. For example, the first input value provided by block 632 may cause switch block 622 to switch to first input 620, and the second input value provided by block 632 may cause switch block 622 to switch to second input 642.

During operation, switch block 622 may output a response or value. For example, in block 650, the output of switch block 622 may be stored (e.g., in a look-up table or database). The current value stored in block 650 may be provided to various blocks or operations described herein. In embodiments, the output of switch block 622 may indicate the expected demand on alternator 112 ([futcurentreq] 342), such as for use in idle speed logic 300 of FIG. 3, among other logic structures or operations.

Figure 7:
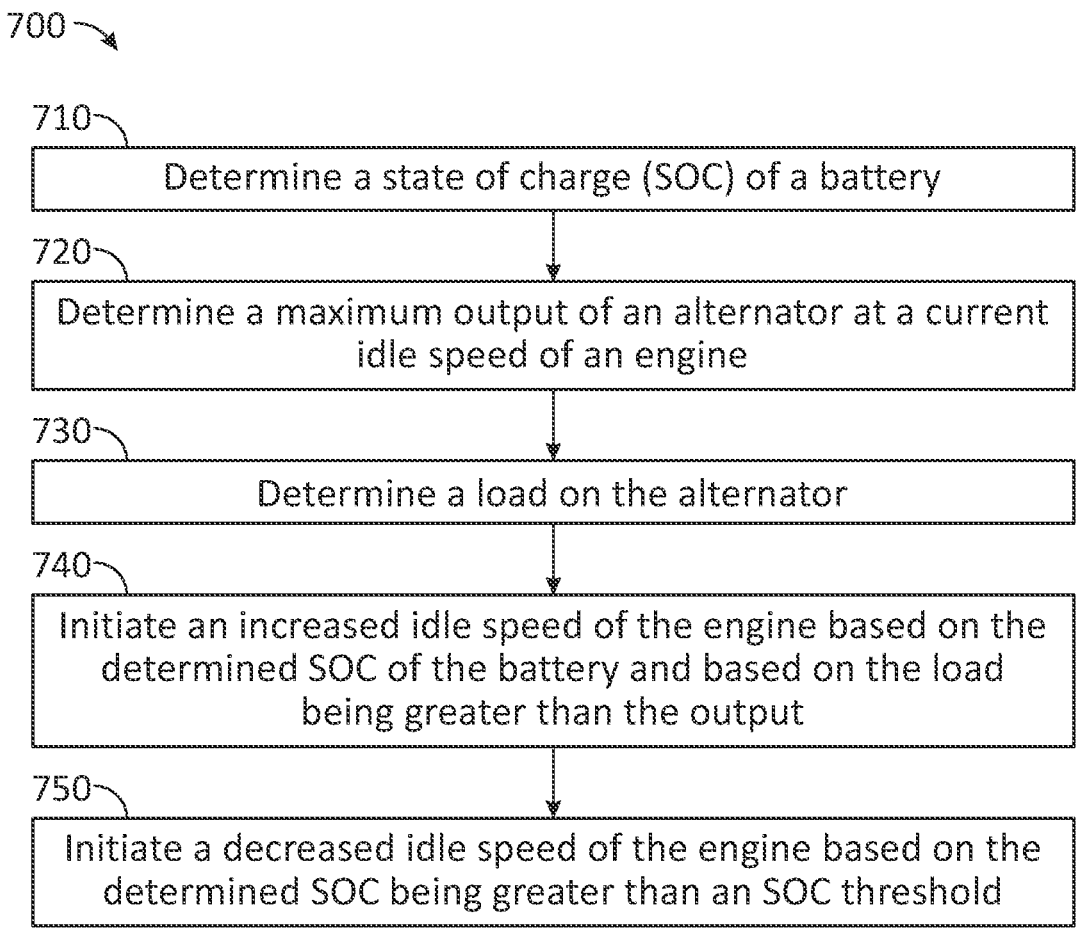
FIG. 7 is a flowchart of a method of controlling an idle speed of an engine, according to one or more embodiments of the disclosure.

FIG. 7 is a flowchart of a method 700 of controlling an idle speed of an engine (e.g., engine 114), according to one or more embodiments of the disclosure. For explanatory purposes, method 700 is described herein with reference to FIGS. 1-6, although method 700 is not limited to the embodiments illustrated in FIGS. 1-6. Note that one or more operations in FIG. 7 may be combined, omitted, and/or performed in a different order as desired.

In block 710, method 700 includes determining a state of charge (SOC) of a battery, such as SOC of battery 110. In embodiments, the SOC of the battery may be determined using SOC logic 400 of FIG. 4, described above. For example, block 710 may include modeling a decrease of the SOC based on an alternator field duty (e.g., [yaltfd] 410) being greater than or equal to an alternator field duty threshold (e.g., enetelc_ALTFD100 418), as described above. As further described above, block 710 may include modeling an increase of the SOC based on the alternator field duty (e.g., [yaltfd] 410) being less than the alternator field duty threshold (e.g., enetelc_ALTFD100 418). Block 710 may include adjusting the modeled SOC based on at least one of an upper SOC limit (e.g., enetelc_SOCMAX) or a lower SOC limit (e.g., enetelc_SOCMIN)

In block 720, method 700 includes determining a maximum output of an alternator at a current idle speed of an engine, such as alternator 112. In embodiments, the maximum output of the alternator may be determined using alternator output logic 500 of FIG. 5, described above. For example, block 720 may include determining the maximum output of the alternator based on at least one of a targeted alternator output voltage from a charge control system (e.g., [yaltpgv] 554), a product of engine speed (e.g., ene_ene) and an alternator pulley ratio (e.g., enetelc_ALTPULLEY), or a combination of an alternator excitation current (e.g., enetelc_ALTEXCITATION) and an alternator field duty (e.g., [yaltfd] 410), as detailed above.

In block 730, method 700 includes determining a load on the alternator. In embodiments, the expected load on the alternator may be determined using alternator load logic 600 of FIG. 6, described above. For example, block 730 may include determining the load on the alternator based on a comparison between an engine coolant temperature (e.g., ethw_ethw) and a coolant temperature threshold (e.g., enetelc_HOTJUDTHW), as described above. When the engine coolant temperature is greater than the coolant temperature threshold, the expected alternator load may be determined based on a combination of an amount of current generated by the alternator (e.g., [yalti] 616) and a current demand of an electric cooling fan (e.g., enetelc_FANFLACUR). When the engine coolant temperature is less than the coolant temperature threshold, the expected alternator load may be determined based on the amount of current generated by the alternator (e.g., [yalti] 616).

In block 740, method 700 includes initiating an increased idle speed of the engine based on the determined SOC of the battery and based on the determined load being greater than the determined maximum output. In embodiments, initiating the increased idles speed of the engine may be based on idle speed logic 300 of FIG. 3, described above. For example, the increased idle speed may be initiated based on the determined SOC being below an SOC threshold (e.g., enetelc_IDLUPSOC 324, as described above).

In block 750, method 700 includes initiating a decreased idle speed of the engine based on the determined SOC being greater than the SOC threshold. In embodiments, initiating the decreased idles speed of the engine may be based on idle speed logic 300 of FIG. 3, described above. For example, the decreased idle speed may be initiated based on the determined SOC being greater than enetelc_SOCOK 328, as described above. In embodiments, the decreased idle speed may be initiated further based on a comparison between a field duty of the alternator and a current demand of an electric cooling fan.

Figure 8:
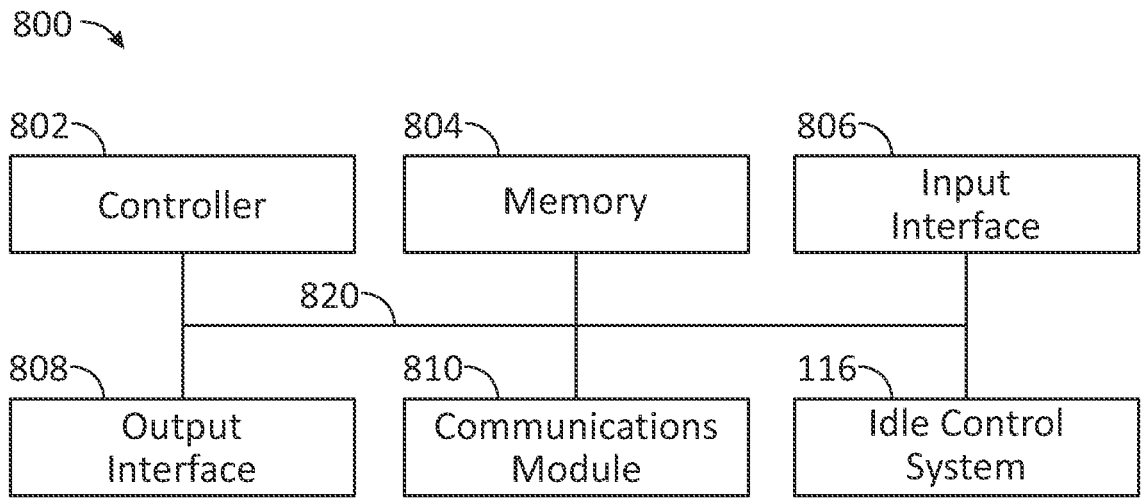
FIG. 8 is a diagram illustrating an example computing or processing system, according to one or more embodiments of the disclosure.

FIG. 8 is a diagram illustrating an example computing or processing system 800 in which embodiments of the present disclosure may be implemented, according to one or more embodiments of the disclosure. For example, idle control system 116, described above, may be implemented using system 800. In some embodiments, method 700 of FIG. 7, described above, may be implemented using system 800. System 800 can be or include a computer, phone, PDA, tablet, server, controller, or any other type of electronic device. Such an electronic device includes various types of computer readable media and interfaces for various other types of computer readable media. As shown in FIG. 8, system 800 includes a controller 802, a memory 804, an input interface 806, an output interface 808, a communications module 810, and idle control system 116.

Controller 802, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 802 may be configured to interface and communicate with the various other components of system 800 to perform such operations. For example, controller 802 may be configured to receive and process data received from a network and/or one or more sensors (e.g., sensors 118), store the data in memory 804, and/or retrieve stored data from memory 804.

Controller 802 may include combinations of hardware and software processing functionality and may be provided with/in and/or communicatively attached to other components to execute appropriate instructions, such as software instructions and/or processing parameters stored in memory 804. In various embodiments, controller 802 may be configured to execute software instructions stored in memory 804 to perform various methods, processes, or operations in the manner described herein.

Memory 804 includes, in one embodiment, one or more memory devices configured to store data and information, including magnetic flux data and position information. The memory 804 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically erasable programmable read-only memory (EEPROM), flash memory, hard disk drive, and/or other types of memory. As discussed above, controller 802 may be configured to execute software instructions stored in memory 804 to perform method 300, method 600, and/or method 800 and process steps and/or operations. Controller 802 may be configured to store data in memory 804.

Input interface 806 includes, in one embodiment, a user input and/or an interface device, such as one or more controls, knobs, buttons, slide bars, keyboards, sensors, cameras, and/or other devices, that are adapted to generate an input control signal. Controller 802 may be configured to sense the input control signals from input interface 806 and respond to any sensed input control signals received therefrom. Controller 802 may be configured to interpret such an input control signal as a value, as generally understood by one skilled in the art. In one embodiment, input interface 806 may include a control unit (e.g., a wired or wireless handheld control unit) having push buttons adapted to interface with a user and receive user input control values. In one implementation, the push buttons of the control unit may be used to control various system functions.

Output interface 808 may enable, for example, the output of data or other information. Output interface 808 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 802 may be configured to render data and information on output interface 808. For example, controller 802 may be configured to render data on output interface 808, such as data stored in memory 804.

In some embodiments, various components of system 800 may be distributed and in communication with one another over a network. In this regard, communications module 810 may be configured to facilitate wired and/or wireless communication among various system components over the network. Such a network may include, for example, a local area network ("LAN"), such as an Intranet, or a wide area network ("WAN"), such as the Internet.

In embodiments, various components of system 800 may be communicatively connected via a system communications bus 820. Bus 820 collectively represents all system, peripheral, and chipset buses that communicatively connect the numerous devices of system 800. For instance, bus 820 may communicatively connect controller 802, memory 804, input interface 806, output interface 808, communications module 810, idle control system 116, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A method comprising:
   determining a state of charge (SOC) of a battery;
   determining a maximum output of an alternator at a current idle speed of an engine;
   determining a load on the alternator; and
   initiating an increased idle speed of the engine based on the determined SOC of the battery and based on the load being greater than the maximum output,
   wherein:
      the increased idle speed is initiated based on the determined SOC being below an SOC threshold; and
      the method further comprises initiating a decreased idle speed of the engine based on the determined SOC being greater than the SOC threshold,
   wherein the decreased idle speed is initiated further based on a comparison between a field duty of the alternator and a current demand of an electric cooling fan.

2. A method comprising:
   determining a state of charge (SOC) of a battery;
   determining a maximum output of an alternator at a current idle speed of an engine;
   determining a load on the alternator; and
   initiating an increased idle speed of the engine based on the determined SOC of the battery and based on the load being greater than the maximum output,
   wherein determining the SOC of the battery comprises modeling the SOC of the battery, the modeling comprising:
   modeling a decrease of the SOC based on an alternator field duty being greater than or equal to an alternator field duty threshold; and
   modeling an increase of the SOC based on the alternator field duty being less than the alternator field duty threshold.

3. The method of claim 2, wherein the determining the SOC of the battery further comprises adjusting the modeled SOC based on at least one of an upper SOC limit or a lower SOC limit.

4. A method, comprising:
   determining a state of charge (SOC) of a battery;
   determining a maximum output of an alternator at a current idle speed of an engine;
   determining a load on the alternator; and
   initiating an increased idle speed of the engine based on the determined SOC of the battery and based on the load being greater than the maximum output,
   wherein the determining the maximum output of the alternator is based on:
      a targeted alternator output voltage from a charge control system;
      a product of engine speed and an alternator pulley ratio; and
      a combination of an alternator excitation current and an alternator field duty.

5. The method of claim 1, A method, comprising:
   determining a state of charge (SOC) of a battery;
   determining a maximum output of an alternator at a current idle speed of an engine;
   determining a load on the alternator; and
   initiating an increased idle speed of the engine based on the determined SOC of the battery and based on the load being greater than the maximum output,
   wherein determining the load on the alternator is based on a comparison between an engine coolant temperature and a coolant temperature threshold.

6. The method of claim 5, wherein:
   when the engine coolant temperature is greater than the coolant temperature threshold, the load is determined based on a combination of an amount of current generated by the alternator and a current demand of an electric cooling fan; and
   when the engine coolant temperature is less than the coolant temperature threshold, the load is determined based on the amount of current generated by the alternator.

7. An idle control system comprising:
   a logic device configured to:
      determine a state of charge (SOC) of a battery,
      determine a maximum output of an alternator at a current idle speed of an engine,
      determine a load on the alternator, and
      initiate an increased idle speed of the engine based on the determined SOC of the battery and based on the load being greater than the maximum output,
   wherein:
      the logic device is configured to initiate the increased idle speed based on the determined SOC being below an SOC threshold; and the logic device is further configured to initiate a decreased idle speed of the engine based on the determined SOC being greater than the SOC threshold, wherein the logic device is configured to initiate the decreased idle speed further based on a comparison between a field duty of the alternator and a current demand of an electric cooling fan.

8. The idle control system of claim 7, wherein the idle control system is part of a vehicle.

9. An idle control system, comprising:
a logic device configured to:
determine a state of charge (SOC) of a battery,
determine a maximum output of an alternator at a current idle speed of an engine,
determine a load on the alternator, and
initiate an increased idle speed of the engine based on the determined SOC of the battery and based on the load being greater than the maximum output,
wherein the logic device, in determining the SOC of the battery, is configured to model the SOC of the battery, the modeling comprising:
modeling a decrease of the SOC based on an alternator field duty being greater than or equal to an alternator field duty threshold; and
modeling an increase of the SOC based on the alternator field duty being less than the alternator field duty threshold.

10. The idle control system of claim 9, wherein the logic device, in determining the SOC of the battery, is further configured to adjust the modeled SOC based on at least one of an upper SOC limit or a lower SOC limit.

11. The idle control system of claim 9, wherein the idle control system is part of a vehicle.

12. An idle control system, comprising:
a logic device configured to:
determine a state of charge (SOC) of a battery,
determine a maximum output of an alternator at a current idle speed of an engine,
determine a load on the alternator, and
initiate an increased idle speed of the engine based on the determined SOC of the battery and based on the load being greater than the maximum output,
wherein the logic device is configured to determine the maximum output of the alternator based on:
a targeted alternator output voltage from a charge control system;
a product of engine speed and an alternator pulley ratio; and
a combination of an alternator excitation current and an alternator field duty.

13. The idle control system of claim 12, wherein the logic device is configured to determine the maximum output of the alternator using a lookup table or map.

14. The idle control system of claim 12, wherein the idle control system is part of a vehicle.

15. An idle control system, comprising:
a logic device configured to:
determine a state of charge (SOC) of a battery,
determine a maximum output of an alternator at a current idle speed of an engine,
determine a load on the alternator, and
initiate an increased idle speed of the engine based on the determined SOC of the battery and based on the load being greater than the maximum output,
wherein the logic device is configured to determine the load on the alternator based on a comparison between an engine coolant temperature and a coolant temperature threshold.

16. The idle control system of claim 15, wherein:
when the engine coolant temperature is greater than the coolant temperature threshold, the logic device is configured to determine the load on the alternator based on a combination of an amount of current generated by the alternator and a current demand of an electric cooling fan; and
when the engine coolant temperature is less than the coolant temperature threshold, the logic device is configured to determine the load on the alternator based on the amount of current generated by the alternator.

17. The idle control system of claim 15, wherein the idle control system is part of a vehicle.

* * * * *